TOOL ADAPTER WITH RETENTION MEANS

Original Filed April 6, 1964

Inventor:
Carl F. Erikson
By: Hofgren, Wegner, Allen, Stellman & McCord
Attorneys

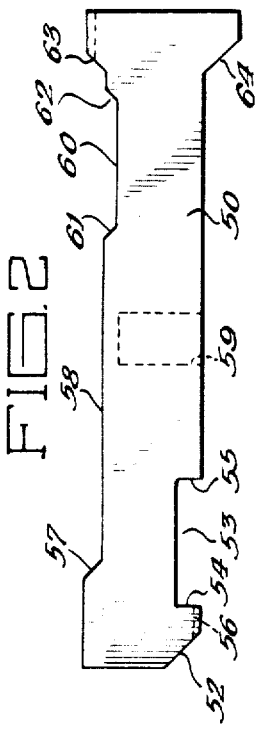
FIG. 2
FIG. 3
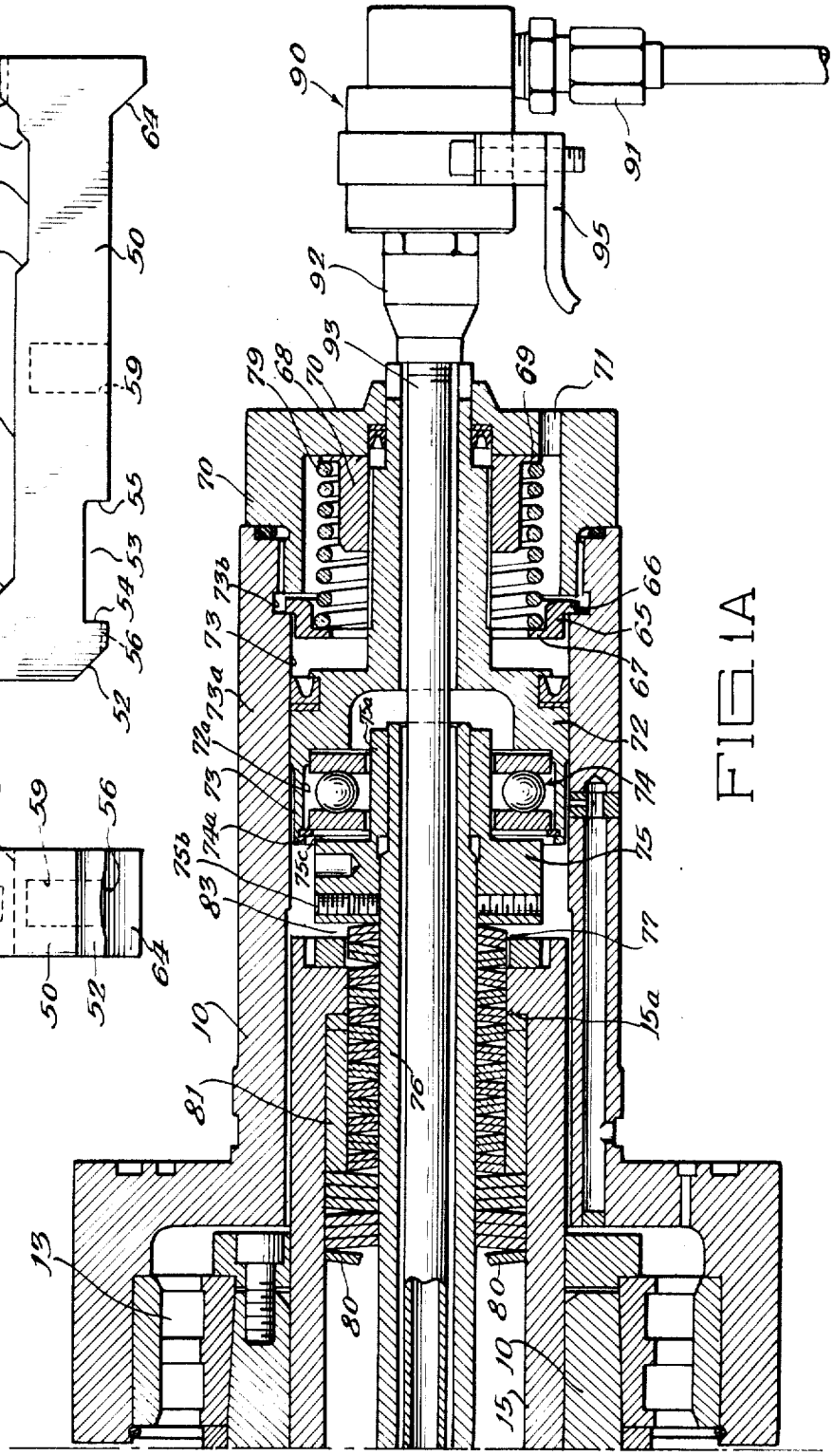
FIG. 1A

TOOL ADAPTER WITH RETENTION MEANS

Original Filed April 6, 1964

United States Patent Office

Re. 26,623
Reissued July 1, 1969

26,623

TOOL ADAPTER WITH RETENTION MEANS

Carl F. Erikson, Belvidere, Ill., assignor to Sundstrand Corporation, a corporation of Delaware Original No. 3,242,819, dated Mar. 29, 1966, Ser. No. 357,467, Apr. 6, 1964. Application for reissue Apr. 11, 1967, Ser. No. 694,759

Int. Cl. B23c *9/00;* B23b *51/00*

U.S. Cl. 90—11 40 Claims

Matter enclosed in heavy brackets [ ] appears in the original patent but forms no part of this reissue specification; matter printed in italics indicates the additions made by reissue.

*ABSTRACT OF THE DISCLOSURE*

*In a machine tool having a rotatable spindle with an internal bore the combination of a collet for gripping a tool adapter and latch means for positively retaining the adapter within the spindle bore. Sensing means is provided for determining when the adapter is properly positioned within the spindle bore, and coolant means is provided for cooling the tool carried by the adapter and the workpiece during a machine operation.*

This invention relates in general to machine tools, and more particularly to an adapter retention construction and associated mechanism.

An object of the invention is the provision of new and improved tool mounting means which will retain a tool and its adapter in a spindle against axial movement relative to the spindle.

A further object of the invention is the provision of a tool mounting means as described in the previous paragraph which is also effective to positively rotate the tool adapter.

A still further object of the invention is to provide tool mounting means for retaining a tool and its adapter against movement both outwardly and inwardly of a spindle.

Still another object of the invention is to provide an adapter having means for adjusting the overall length of the adapter and its included tool with positively acting locking means which cooperate with the length adjusting means to prevent axial movement of the adapter.

Still another object of the invention is the provision of an adapter as described in the previous paragraph wherein means for rotatably interlocking the adapter to the spindle are associated with the locking means.

Still another object of the invention is to associate coolant supply means with the tool mounting assembly described above.

Still another object of the invention is to provide a *tool* mounting assembly with means for determining the positive seating of an adapter in the spindle.

Still another object of the present invention is to provide a tool mounting assembly as described in the previous paragraph with means for cleaning the tool adapter seat.

And another object of the invention is the provision of improved means for releasing a collet and adapter latching means, to free the adapter for movement relative to a spindle.

These and other objects of the invention will become more fully apparent from the following specification and drawings, wherein:

FIGURE 1a is a continuation of FIGURE 1 showing the other end of the machine tool head;

FIGURE 2 is a detail view of a latch member of the present invention;

FIGURE 3 is an end view of the structure set forth in FIGURE 2;

FIGURE 11 is a fragmentary view showing a modified latching arrangement.

Figure 1:
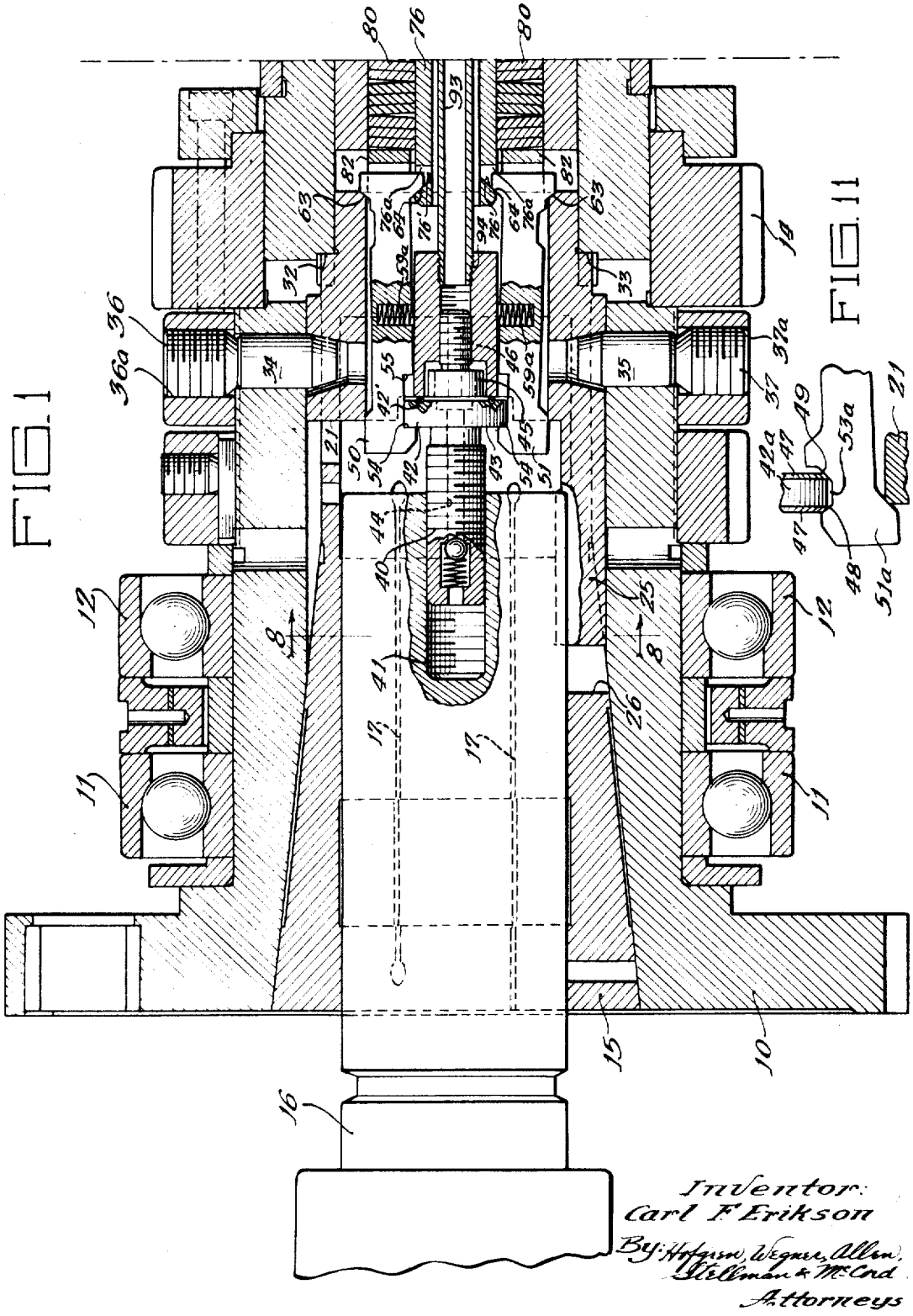
FIGURE 1 is a fragmentary longitudinal sectional view of one end of a machine tool head illustrating a preferred embodiment of the invention.
Figure 6:
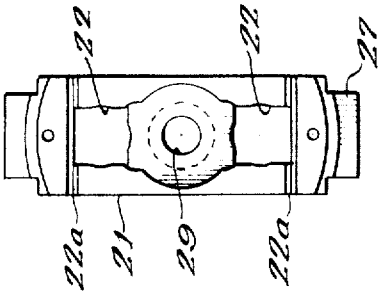
FIGURE 6 is a rear view of the key body shown in FIGURE 4 and FIGURE 5.

While this invention is susceptible of embodiment in many different forms, there is shown in the drawings and will herein be described in detail a preferred embodiment of the invention and a modification thereof, with the understanding that the present disclosure is to be considered as an exemplification of the principles of the invention, and is not intended to limit the invention to the embodiment illustrated. The scope of the invention will be pointed out in the appended claims.

Referring now to the drawings, wherein like reference characters designate like or corresponding parts throughout the several views, a machine tool spindle head is shown which is generally of the type described in the U.S. patent application of Swanson and Erikson, Ser. No. 59,236, filed Sept. 29, 1960, for a "Tool Supporting Adapter," now Patent No. 3,136,563 granted June 9, 1968. Reference may be made to the above mentioned application for a full understanding of the complete unit, as only a description of the essential operating structure and the novel changes and improvements are herein set forth in detail.

In FIGURE 1, reference numeral 10 indicates a spindle, which is rotatably mounted in a frame, not shown, by suitable bearing assemblies 11, 12 and 13. A gear 14 is operatively secured to spindle 10 and cooperates with a gear train, not shown, which is mounted in the aforementioned frame, to rotatably drive spindle 10 about its longitudinal axis.

Spindle 10 has an open ended central bore in which a suitable expanding collet 15 is telescopically mounted. The outer end of the central bore in spindle 10 is frusto-conical in shape, and cooperates with the frusto-conical outer end of collet 15 to grip an adapter having a body 16 as collet 15 is drawn into the spindle. Collet 15 is provided with longitudinally extending slots 17 which enable the collet to be contracted inwardly as the collet is drawn into the spindle to engage the adapter shank with a tight grip. As is seen in FIGURE 1a, the right hand end of collet 15 terminates in an inwardly directed flange 15a. A cutting tool is releasably held in adapter 16 by any suitable means, as is well known in the art. When making certain cuts with the cutting tool, the friction grip between the collet and the adapter may be insufficient to transmit torque from the spindle to the cutting tool. Accordingly, a key 25 (FIGURES 4–8) is provided to directly couple the spindle 10 to the adapter 16, so that the combined action of the collet and the key will provide a positive drive to the adapter.

Figure 5:
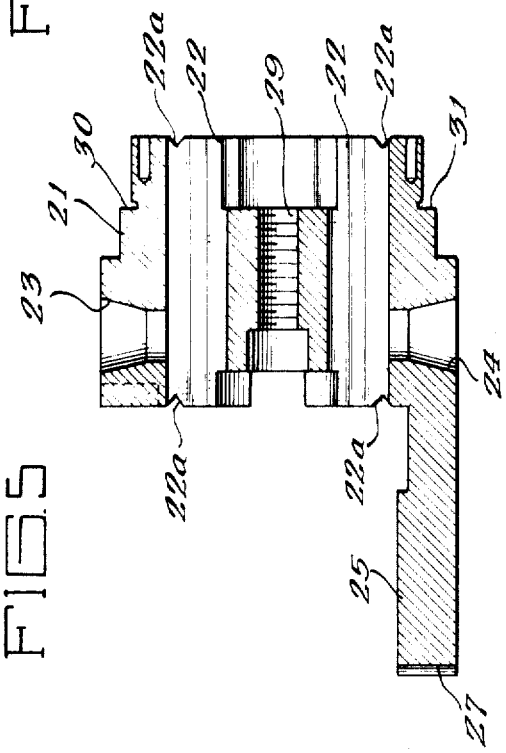
FIGURE 5 is a sectional view, taken along line 5—5 of FIGURE 4 and line 5—5 of FIGURE 7.
Figure 7:
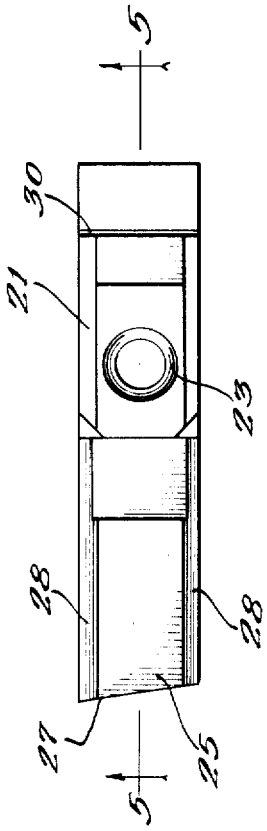
FIGURE 7 is a plan view of the key body shown in FIGURES 4–6.
Figure 4:
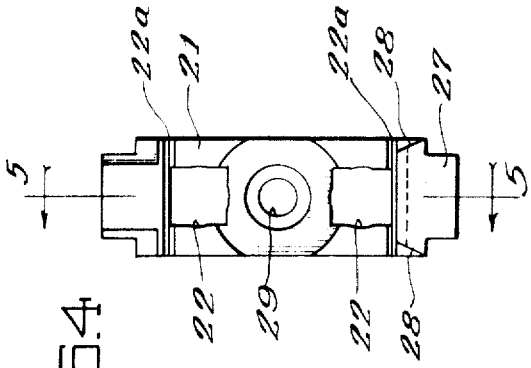
FIGURE 4 is a front view of a preferred embodiment of the key body of the present invention.

Key 25 is integral with a body 21 having a pair of spaced apart substantially parallel longitudinal openings 22 extending from end to end thereof. Openings 22 are generally rectangular in cross section, and have transverse inclined faces 22a spanning the open end of each opening. The top and bottom surfaces of body 21, as viewed in FIGURE 5, are provided with countersunk holes 23 and 24, which are positioned in substantial alignment. Key 25 extends longitudinally outwardly from body 21 and passes through an elongate opening 26 suitably provided in the side wall of collet 15. Key 25 includes a lower portion of reduced width 27 that is engageable with a longitudinally extending keyway in spindle 10, and an upper portion of larger width having tapered sides 28 which are engageable with a suitably tapered keyway 29 in adapter 16. From FIGURE 8, it is clear that the line of force, indicated by line L/F of the adapter on coupling member 25 passes through the corner of the spindle keyway. This eliminates any twisting loads on member 25 leaving only simple compression loads.

Key body 21 is provided with step portions 30 and 31, which are engageable with locating shoulders 32 and 33 on spindle 10 to positively locate body 21 longitudinally within the spindle. Body 21 is held in position by retainers 34 and 35 having tapered ends which engage countersunk holes 23 and 24. When an axial force is applied to the adapter, retainers 34 and 35 will be loaded mainly in compression rather than bending, due to the interaction of the tapered faces. Retainers 34 and 35 are pre-loaded by engagement with suitable thread members 36 and 37, that are threadably received in holes 36a and 37a.

As is described in detail in the aforementioned patent application, an adjustable stop button 40 is threadably mounted in an opening 41 in one end of the adapter body to provide variably extendable means for adjusting the overall length of the adapter and its included tool, and to compensate for variations of tool length due to sharpening. Stop button 40 includes an enlarged head 42 having a planar undersurface 43 which provides a gripping surface to retain the adapter against longitudinal movement relative to the spindle. The outer surface of head 42 includes a groove in which an O-ring 42' is positioned, the purpose of which will hereinafter appear. The stop button 40 also includes a longitudinally extending channel 44, the purpose of which will also hereinafter become more fully apparent. As is best seen in FIGURE 1, head 42 engages a bolt 45 which is mounted in a threaded hole 29 in key body 21 to provide a stop means that sets the depth to which the adapter is placed in the spindle. Bolt 45 is provided with a longitudinally extending channel 46 which is shown axially aligned with channel 44 and placed in communication therewith when head 42 abuts against the head of bolt 45. As will hereinafter become more apparent, channels 44 and 46 may be offset from one another, if desired.

In addition to the grip of collet 15, longitudinal retention of adapter 16 is achieved by a pair of latches 50 and 51 which are mounted in the openings 22 provided in key body 21. Latches 50 and 51 are identical and therefore a description will be given only of latch 50 with the understanding that common reference numerals will be used to indicate the common areas on each latch. As is best seen in FIGURE 2 and FIGURE 3, the leading end of latch 50 is provided with an inclined lower face 52 and a notch 53 which defines abutments 54 and 55. The undersurface of the leading end of latch 50 is provided with an arcuate groove 56 which corresponds in size to a diameter of stop button head 42. This provides a clearance which enables adapter 16 to be withdrawn from the spindle without difficulty, as will later be explained in detail. The upper surface of the leading end of latch 50 is provided with an inclined face 57 that is positioned inwardly of abutment 54, and which terminates in a planar surface 58. A cylindrical bore 59 is formed in the lower surface of latch 50 at approximately the center thereof, and is adapted to receive a compression spring 59a which is seated against the wall of opening 22. The upper surface of the trailing end of latch 50 is provided with a notch 60 having inclined ends 61 and 62, and an additional inclined face 63 which is positioned above an inclined face 64 on the lower surface of the trailing end. Faces 57 and 63 correspond in inclination to the inclination of the inclined surface of the adjacent face 22a. The purpose of the aforedescribed latch configuration will be hereinafter set forth in detail.

A modified form of latch is shown at 51a in FIGURE 11, and the same numerals have been used to indicate areas corresponding to common areas on latch 50 and stop 40, with the addition of the subscript "a." Stop head 42a is provided with opposed bevelled edges 47 which extend circumferentially therearound. Notch 53a in latch 51a is relatively narrow, and receives head 42a therein, with edges 47 being positioned against inclined surfaces 48 and 49 at the end of notch 53a. Thus, it will be apparent that surface 48 cooperates with the edge 47 on the undersurface of head 42a to retain the adapter against longitudinal movement outwardly of the spindle, and surface 49 cooperates with the edge 47 on the outer surface of head 42a to retain the adapter against longitudinal movement inwardly of the spindle.

The latch actuating means and the collet actuating means will be best understood from an examination of FIGURE 1a. Cap 70 is provided with a port 71 which is adapted to be connected to a source of hydraulic fluid, not shown. The introduction and withdrawal of hydraulic fluid through port 71 shifts a piston 72, which is slidably mounted in the cylinder 73 that is defined by the inner wall of the right hand end of a stationary sleeve 73a. A housing 75 is affixed to a plunger 76, by threading or the like, for actuation thereof by a bearing 74 that is retained in a bore 72a in piston 72 by a snap ring 74a. It will be understood, of course, that the inner diameter of bearing 74 is larger than the outer diameter of the axial extension 75a of housing 75, and that the inner diameter of snap ring 74a is larger than the outer diameter of the main body portion 75b of housing 75, so that the piston 72 is free to move relative to housing 75. It will be further understood that as piston 72 moves to the left, as viewed in FIGURE 1a, bearing 74 will contact the transverse shoulder 75c of housing 75, and continued movement of piston 72 will shift plunger 76.

Means are provided for shifting piston 72 to the right, as viewed in FIGURE 1a, after the plunger 76 has been actuated, and include a ring 65 having a first outwardly extending flange 66 seated in an annular groove 73b in cylinder 73, and a second inwardly extending flange 67. A second ring 68 is fixed to the end portion of piston 72 and includes an annular flange 69. A compression spring is biased between flanges 67 and 69 and urges piston 72 to hte right. It will be understood that after plunger 76 has been actuated, suitable valve means, not shown, will disconnect the source of pressurized fluid from port 71, and the force of spring 79 will shift piston 72 to the right. As piston 72 moves to the right, ring 74a will bear against bearing 74, so that bearing 74 will move with piston 72 and be out of engagement with shoulder 75c. It is important that thrust bearing 74 not engage shoulder 75c when the spindle is rotating, to obviate the problem of bearing failure at high spindle speeds.

A plurality of spring washers 77 surround plunger 76 and abut against housing 75, and comprise a moderately strong spring means which may be set at a predetermined value. A second series of spring washers 80 surrounds plunger 76, and engages a sleeve 81 that in turn surrounds spring washers 77. Spring washers 80 provide a spring means which is substantially stronger than that provided by spring washers 77. As shown in FIGURE 1, the left hand end of spring washers 80 are positioned against abutments 82 which engage the right hand end of key body 21. The left hand end of plunger 76, as viewed in FIGURE 1, is provided with a pair of opposed grooves which are adapted to receive the trailing end of latches 50 and 51. Each groove includes an inclined face 76' which corresponds in inclination to the inclined surface 64 of latches 50 and 51. The grooves terminate in an abutment 76a, which is disposed at right angles to the axis of plunger 76, and which is engageable with the trailing end of latches 50 and 51.

As illustrated in FIGURE 1, collet 15 is closed into clamping engagement with adapter 16, and latch abutments 54 firmly engage head 42 to prevent axial movement of the adapter. When it is desired to release the adapter to change the tool, fluid under pressure is admitted through opening 71 to shift piston 72 to the left, as viewed in FIGURE 1a. This movement imparts a corresponding movement to housing 75 and plunger 76, which shifts through area 83 against the bias of the weaker spring means provided by washers 77 to release latches 50 and 51. Movement of plunger 76 to the left, as viewed in FIGURE 1, releases faces 76' from engagement with latch surfaces 64. As plunger 76 continues to move to the left, shoulder portions 76a engage the trailing ends of latches 50 and 51, with latch surfaces 57 and 63 sliding on their respective faces 22a. As latches 50 and 51 continue to move to the left, springs 59a will force the latches apart and release abutments 54 from gripping engagement with head 42. When housing 75 completes its travel through gap 83, it will engage the end of collet 15 and shift it to the left against the bias of springs 80 to release it from engagement with adapter 16.

While the illustrated latch embodiments 50, 51 and 51a have all been shown as being movable longitudinally in the spindle to release the adapter, the present invention also contemplates that radially movable or pivotally mounted latches may be used, and thus the invention is not to be limited to the specific embodiments shown.

When it is desired to insert a different tool in the spindle, an adapter is placed in an open collet with its stop button 42 positioned against bolt 45, and the hydraulic pressure on piston 72 is released. Spring washers 80 first act through sleeve 81 against flange 15a to shift collet 15 to the right, and it will close into gripping engagement with adapter 16. It should be noted that the length of opening 26, and of slots 53 and 60 is such as to allow this action to take place throughout a wide range of thickness of the head of stop button 40. The release of the hydraulic pressure will, of course, allow less strong spring washers 77 to function after springs 80 and shift plunger 76 to the right, with surface 76' engaging latch surfaces 64 to force the latches into the locked position shown in FIGURE 1. In the locked position latches 50 and 51, in combination with collet 15, effectively resist the axial forces upon the adapter 16. Such axial forces are created by the use of steep helix cutters, such as various milling cutters.

Figure 10:
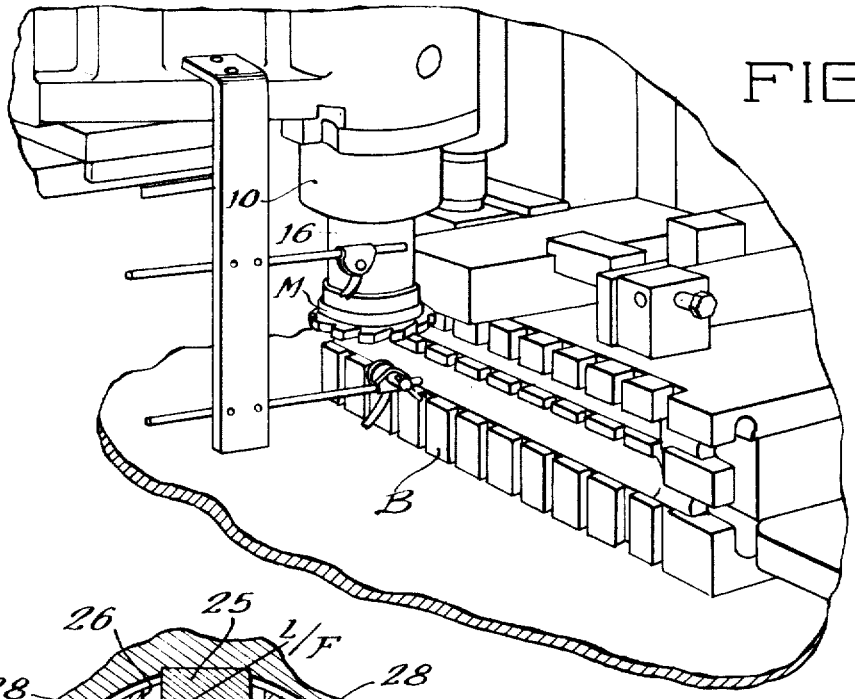
FIGURE 10 is a framentary perspective view of the subject machine tool construction performing a milling operation.
Figure 8:
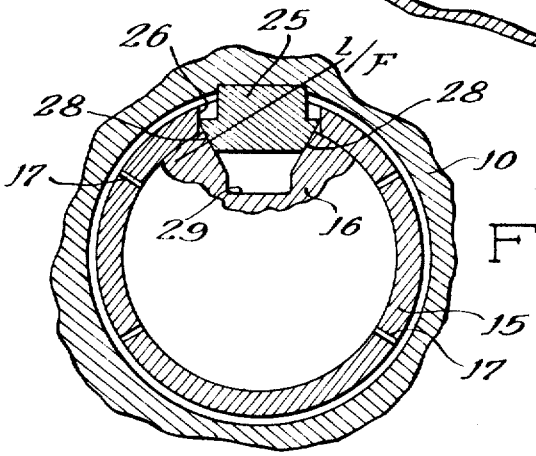
FIGURE 8 is a sectional view taken substantially as shown along line 8—8 of FIGURE 1.

In FIGURE 10 a mill M is shown milling a step in a block B where the block is between the cutter and the spindle so that the cutter forces tend to pull the cutter and adapter out of the spindle. Also, it can be readily understood that when making a relatively heavy cut with an end mill having flutes with a 30° helix, substantial chattering may occur, which causes an axial force of large magnitude. If this force exceeds the axial gripping ability of collet 15, it will nevertheless be effectively resisted by latches 50 and 51, due to the engagement of abutments 54 with surface 42, the engagement of surfaces 64 with surfaces 76', and the engagement of surfaces 63 with surfaces 22a. The latch surfaces 54 are pulled against the tool stop 42 by a force essentially that of the springs 77. If a force is applied to the adapter to pull it out of the spindle, the force required will be the spring force of springs 77 plus the friction of the several surfaces in contact between the latches 50, the key body 21 and the plunger 76. By the selecion of angles at surfaces 63 and 64, the magnitude of the friction forces can be controlled so that the spring force of 77 is multiplied several times or increased to the point where the latch will be self locking. It should also be noted that the interaction of the inclined faces is also effective to resist the pivotal pull out tendency which occurs when a long boring bar is used with certain types of adapters.

Referring again to FIGURE 1a, a fitting 90 is shown having an inlet 91 which is adapted to be connected to a source of collant, not shown. An outlet 92 is rotatably mounted in fitting 90 and is connected to a tube 93 which extends longitudinally through the spindle. It should be understood, of course, that cap 70, piston 72, and plunger 76, are each provided with a suitable aperture to accommodate tube 93. Tube 93 includes a threaded end portion 94 which is received in the threaded opening 29 of key body 21. The coolant will thus travel through a continuous channel formed by inlet 91, fitting 90, outlet 92, tube 93, bolt channel 46, stop button channel 44, and into the interior of the adapter. Fitting 90 is provided with a suitable bracket 95 which is adapted to secure it to the machine tool frame, not shown.

The coolant supply means described above may also be used to determine whether or not stop button 40 is positively seated against bolt 45. The means by which this is accomplished is shown schematically in FIGURE 9.

Figure 9:
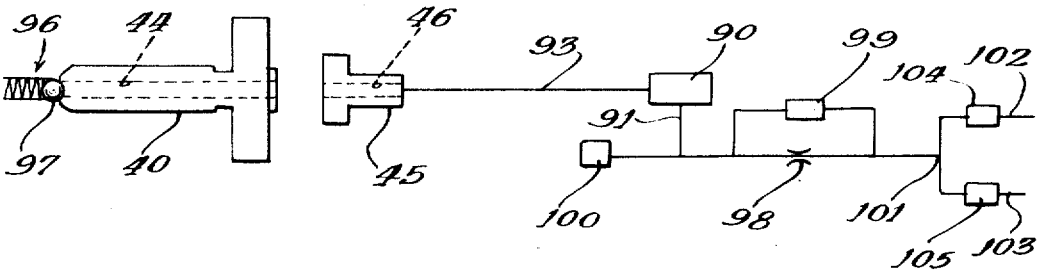
FIGURE 9 is a schematic view of one embodiment of adapter sensing apparatus.

Check valve means, indicated generally by reference numeral 96, are provided at the left hand end of stop button 40, as viewed in FIGURE 9, and include a ball 97 which normally blocks channel 44 when stop button 40 is not seated against bolt 45. Ball 97 is held against stop button 40 by a spring, as is well known in the art, that provides a known spring force which allows a predetermined pressure in channel 44 to unseat ball 97. An orifice 98 is provided in the coolant inlet line to provide only a restricted volume of coolant for testing purposes. A solenoid operated on-off valve 99 is provided in parallel with orifice 98, and it will be understood that when stop button 40 is seated against bolt 45, the valve 99 can be actuated to bypass orifice 98 and allow the full volume of coolant to flow through the adapter. A pressure switch 100 is provided which is actuated by the pressure build-up when the adapter is positively seated against bolt 45. When stop button 40 engages bolt 45, O-ring 42' will create a fluid tight connection and establish communication between channels 44 and 46. When using the system to make sure the tool is properly seated, the stop button 40 is held against the bolt 45 by hand or mechanical means and the collet 15 is closed. To test for positive contact, a valve at 104 is energized to admit coolant. The valve 99 is not energized so that a restricted flow of coolant must pass through the orifice 98. If the tool stop 40 is not against the bolt 45, the restricted flow will leak away, and not actuate the pressure switch 100. If contact exists between 40 and 45, the pressure in line 93 will build up to the value set by the check valve 96 and the pressure switch will be operated giving a signal that the tool is properly located.

If coolant is then required for machining operation, the bypass valve 90 will be opened releasing the full flow of coolant. Otherwise, valve 104 will be closed stopping the restricted coolant flow.

It should also be understood that a pneumatic system might also be used in combination with the aforedescribed coolant system to sense the seating of the adapter against its stop means. To effect this, a source of compressed air, not shown, and the coolant supply source, not shown, are connected to a common junction 101 by lines 102 and 103, respectively. The valve 104 and a valve 105 are provided in lines 102 and 103 to control the flow of the coolant and air, respectively, into the spindle. Coolant supply valve 104 is shut off prior to insertion of the adapter in the spindle, and air supply valve 105 is turned on to allow air to flow through the system. The flow of air through the system is effective to clean off any foreign particles which may be present upon the mating surfaces of stop button 40 and bolt 45, which allows the adapter 16 to be positively seated within the spindle. Accordingly, tools which are preset to an accurate length may be correctly located in the spindle. As head 42 approaches bolt 45 the air flow out of channel 46 will be restricted and the pressure in channel 46 will rise to actuate the switch 100. When head 42 engages bolt 45, coolant supply valve 104 may be opened to introduce coolant into the system. It will be readily appreciated that the sensing of the seating of the adapter, as described above, is accomplished without any wastage of coolant. When opening valve 104 to introduce the coolant into the system, valve 105 may also be left open to allow a combined flow of air and coolant through the system. The air supply may also be used to operate accessories which may be mounted in the spindle as desired.

I claim:

[1. In combination, a machine tool having a rotatable spindle with an internal bore, a tool adapter positionable in said bore and having a body adapted to hold a tool at one end thereof, selectively operable constrictive means in said spindle to grip the adapter, and latch means for engaging said adapter to prevent axial pull out of said adapter.]

[2. In combination, a machine tool having a rotatable spindle with an internal bore, a tool adapter positionable in said bore and having a body adapted to hold a tool at one end theerof, selectively operable constrictive means in said spindle to grip the adapter, latch means for engaging said adapter to prevent axial pull out of said adapter, and a single power element for releasing both said constritcive means and said latch means.]

3. In combination, a machine tool having a rotatable spindle with an internal bore, a tool adapter positionable in said bore and having a body adapted to hold a tool at one end thereof, selectively operable constrictive means in said spindle to grip the adapter, latch means for engaging said adapter to prevent axial pull out of said adapter, and means for actuating said latch means after said constrictive means have gripped the adapter.

4. In combination, a machine tool having a rotatable spindle with an internal bore, an abutment in said bore, a tool adapter positionable in said bore against said abutment and having a body with engageable means thereon, selectively operable constrictive means in said spindle to grip the adapter, and latch means for engaging said engageable means to prevent axial pull out of said adapter.

5. In combination, a machine tool having a rotatable spindle with an internal bore, an abutment in said bore, a tool adapter positionable in said bore and having a body adapted to hold a tool at one end thereof and the opposite end having an adjustable member for engaging said abutment and establishing an effective overall length for the adapter and tool carried thereby, selectively operable constrictive means in said spindle to grip the adapter, and latch means for engaging said adjustable member to prevent axial pull out of said adapter.

6. In combination, a machine tool having a rotatable spindle with an internal bore, a tool adapter positionable in said bore and having a body adapted to hold a tool at one end thereof, selectively operable constrictive means in said spindle to grip the adapter, latch means for engaging said adapter to prevent axial pull out of said adapter, means within said spindle for actuating said constrictive means and said latch means, and means outside of said spindle for releasing said constrictive means and said latch means.

7. In combination, a machine tool having a rotatable spindle with an internal bore, a tool [adapted] *adapter* positionable in said bore and having a cylindrical body adapted to hold a tool at one end thereof, means for sensing the presence of an adapter in said bore, and latch means for engaging said adapter to prevent axial pull out of said adapter.

8. In combination, a machine tool having a rotatable spindle with an internal bore, a tool adapter positionable in said bore and having a cylindrical body adapted to hold a tool at one end thereof, latch means for engaging said adapter to prevent axial pull out of said adapter, a coolant channel in said spindle adapted to communicate with said adapter, and means providing a resilient seal between said coolant channel and said adapter.

9. In combination, a machine tool having a rotatable spindle with an internal bore, an abutment in said bore, a tool adapter positioned in said bore forwardly of said abutment and having a body that is cylindrical from end to end thereof and adapted to hold a tool at the forward end thereof, the rearward end of said body having an adjustable stop for engaging said abutment and establishing an effective overall length for the adapter and tool carried thereby, said stop having a gripping surface disposed at right angles with respect to the axis of said adapter, and latch means movable into engagement with the gripping surface on said adjustable stop after said stop has been positioned in engagement with said abutment to prevent axial pull out of said adapter in said spindle.

10. In combination, a machine tool having a rotatable spindle with an internal bore, an abutment in said bore, a tool adapter positionable in said bore and having a cylindrical body adapted to hold a tool at one end and the opposite end having an adjustable member for engaging said abutment and establishing an effective overall length for the adapter and tool carried thereby, said member having spaced apart coplanar locking surfaces, and latch means releasably engaging both said locking surfaces to prevent axial movement of said adapter into or out of said spindle.

11. In a machine tool having a head including a rotatable spindle receiving a tool carrying adapter, means for locking said adapter for rotation with said spindle and preventing axial movement of said adapter relative to said spindle comprising: a body having guide means, means fixedly mounting said body in said spindle; key and keyway means cooperating to lock said spindle and said adapter for rotation together; and a latch operatively associated with said guide means and engaging said adapter to prevent relative axial movement between said adapter and said spindle.

12. The locking means defined in claim 11 wherein said keyway means comprises aligned, longitudinally extending keyways in said spindle and said adapter, and wherein said key is integral with said body and extends axially outwardly therefrom into said keyways; said body being provided with a pair of guide means defined by spaced apart longitudinally extending openings, and a second latch, each of said openings receiving one of said latches, said latches gripping said adapter at opposite sides thereof.

13. The locking means defined in claim 11 wherein spring means bias said latch into firm gripping engagement with said adapter.

14. The locking means defined in claim 11 wherein said latch has spaced surfaces engaging opposed sides of said adapter to retain said adapter against axial movement in either axial direction.

15. A machine tool as defined in claim 11 in which said adapter includes a portion having inclined edges on opposed surfaces thereof, and wherein said latch has spaced inclined surfaces each engaging one of said edges to retain said adapter against axial movement in either axial direction.

[16. In a machine tool utilizing a tool adapter having a body with locking means thereon, a spindle having a bore with a contractible collet engageable with said adapter body, latch means within said bore engageable with the locking means of the adapter, and means for actuating said collet and latch means, said actuating means having a portion which is rotatable relative to said collet and latch means and is selectively engageable for actuation of the collet and latch means.]

[17. In a machine tool as defined in claim 16 in which said actuating means includes spring means for moving both said latch means and collet to active position and a single power element which acts in opposition to said spring means to release both said collet and said latch means, said power element being the portion of said actuating means which is rotatable relative to said collet and latch means.]

18. A machine tool having a spindle with a bore for receiving a tool, means in said bore for sensing the presence of a tool including a member positioned for engagement by a tool, and a fluid channel in said member positioned for obstruction by the tool when present whereby the pressure of fluid in said channel provides an indication of tool presence.

19. A machine tool as defined in claim 18 wherein a pair of fluid lines are alternatively connectable to said channel for supplying either sensing fluid or coolant fluid to said channel.

20. In combination, a machine tool having a rotatable spindle with an internal bore, stop means fixedly mounted in said bore and including a body having guide means, a tool adapter positioned in said bore and having a tool mounted at one end thereof, a stop button at the other end of said adapter seated against said stop means, key and keyway means drivingly connecting said adapter and said spindle, a latch slidably positioned in said body guide means, said latch having an abutment releasably gripping said stop button to prevent axial movement of said adapter relative to said spindle, spring means biasing said latch into secure gripping engagement with said stop button, a plunger reciprocally mounted in said spindle, said plunger having means engageable with said latch to shift said abutment into and out of gripping engagement with said stop button, and means for shifting said plunger in said spindle.

21. In combination, a machine tool having a rotatable spindle with an internal bore, said bore having an open end and a closed end, stop means including an apertured body fixedly mounted in said bore between said open and closed ends, a tool adapter positioned in the open end of said bore and having a tool mounted at one end thereof, a stop button at the other end of said adapter seated against said stop means, said body having a longitudinally extending key drivingly connecting said adapter and said spindle and a latch slidably positioned in a body aperture, said latch releasably gripping said stop button to prevent axial movement of said adapter relative to said spindle, a plunger reciprocally mounted in said spindle, said plunger having means engageable with said latch to shift said latch into and out of gripping engagement with said stop button, an expandable collet positioned in the open end of said bore and surrounding said adapter, a flange on said collet, first spring means acting between said body and said flange to urge said collet towards the closed end of said spindle, said collet having an elongate opening through which said key extends, an abutment mounted on said plunger and spaced from said collet when said latch is engaging said stop button, second spring means acting between said plunger abutment and said first spring means, and reciprocal piston means mounted in the closed end of said bore and engageable wtih said plunger abutment when said piston moves towards the open end of said bore to shift said plunger and first compress said second spring means to release said latch from engagement with said adjustable stop and second shift said collet toward the open end of said bore against the bias of said first spring means to release said collet from gripping engagement with said adapter.

22. The combination defined in claim 21 wherein said first spring means is substantially stronger than said second spring means.

23. The combination defined in claim 21 wherein a passageway is provided in the closed end of said spindle, in said piston, in said plunger, in said body, and in said stop button whereby a continuous coolant channel is created which extends from the exterior of said spindle into the interior of said adapter.

24. The combination defined in claim 21 wherein said body is provided with an inclined surface adjacent said aperture, said latch including a first inclined surface abutting said body inclined surface when said latch is positioned in gripping engagement with said stop button, a second inclined surface on said latch, and said plunger means including an inclined surface engageable with said latch second inclined surface when said latch is positioned in gripping engagement with said stop button.

25. A device for preventing relative axial movement between a first member having a bore with an internal shoulder and a second member telescopically positioned in the bore and having a gripping surface, comprising: a body positioned in said bore and seated against said shoulder; means engaging said body and immovably holding said body against said shoulder; a pair of spaced apart longitudinal openings in said body, an inclined surface adjacent each end of said openings, said surfaces each facing inwardly into said bore; a latch slidably positioned in each opening, each latch having first and second spaced apart inclined surfaces facing outwardly of said bore and engaging said body inclined surfaces, an abutment adjacent one end of each latch facing inwardly into said bore and engaging said gripping surface, a third inclined surface at the opposite end of each latch and facing inwardly into said bore; a plunger reciprocally mounted in said bore and having a pair of inclined surfaces engaging said latch third inclined surfaces; and spring means urging said plunger axially of said bore.

26. The device in claim 25 wherein means are provided for releasing said latches from engagement with said gripping surface, said means including a shoulder on said plunger adjacent each plunger inclined surface and engageable with said latches upon reciprocation of said plunger to release said latch abutments from engagement with said gripping surface.

27. In combination: a machine tool having a rotatable spindle with an internal bore; a member fixedly mounted in said bore and having a channel extending therethrough; a tool adapter positioned in said bore and having a body adapted to hold a tool at one end, an element on the other end of said adapter and positionable adjacent said member, a channel extending through said element and adapted to communicate with said member channel; and means for sensing the presence of the adapter comprising, a valve in said element channel adapted to open at a given predetermined pressure to permit fluid flow therethrough, a pressure responsive switch actuable by a pressure indicating the presence of said adapter, and means connecting said pressure switch, member channel, element channel and valve to a source of fluid.

28. The combination defined in claim 27 wherein said conduit means includes means for providing a restricted volume of fluid for sensing.

29. A tool supporting, driving and handling adapter comprising, a cylindrical body supporting a tool adjacent an end thereof and adapted to be mounted in a spindle socket, adjustable means at an opposite end of the body positionable at different distances from said opposite end of the body for seating in said spindle socket and establishing an over-all effective length for the adapter and a tool carried thereby, a channel extending through said adjustable means, and means providing a fluid tight seal around said channel when said body is seated in said spindle socket.

*30. In combination, a machine tool having a rotatable spindle with an internal bore, a tool adapter positionable in said bore and having a body adapted to hold a tool at one end thereof, selectively operable constrictive means in said spindle to grip the adapter, latch means for engaging said adapter to prevent axial pull out of the adapter, a draw bar for actuating said latch means, spring means biasing said draw bar to move said latch means into engagement with said adapter to retain said adapter, and interengaging inclined surface means on said draw bar,*

*said latch means, and in said spindle bore for supplementing the retention effect of said spring means.*

*31. A device for preventing relative axial movement between a first member having a bore and a second member telescopically positioned in the bore and having a gripping surface, comprising: a body positioned in said bore; means engaging said body for holding the same against movement in said bore; a pair of spaced apart longitudinal openings in said body, a pair of spaced apart inclined surfaces in each of said openings; a latch slidably positioned in each opening, each latch having first and second spaced apart inclined surfaces each being positioned for engagement with one of said body inclined surfaces, an abutment adjacent one end of each latch engaging said gripping surface, a third inclined surface at the opposite end of each latch; a plunger reciprocally mounted in said bore and having a pair of inclined surfaces engaging said latch third inclined surfaces; and spring means urging said plunger axially of said bore.*

*32. In combination, a machine tool having a rotatable spindle with an internal bore, a tool adapter positionable in said bore and having a body adapted to hold a tool at one end thereof, selectively operable constrictive means in said spindle to grip the adapter, and radially and generally longitudinally movable nonpivoted latch means for engaging said adapter surface to prevent axial pull out of said adapter.*

*33. In combination, a machine tool having a rotatable spindle with an internal bore; means defining a surface in said spindle bore inclined with respect to the axis thereof; a tool adapter positionable in said bore and having a body adapted to hold a tool in one end thereof, said adapter having a gripping surface; latch means including at least one latch member in said spindle bore having a first surface adapted to engage the gripping surface of said adapter, said latch member having a second surface inclined with respect to the axis of said spindle bore and engageable with the inclined surface in said spindle bore, said latch member having a third surface inclined with respect to the axis of said spindle bore in a direction opposite from said latch member second surface; and means for releasing the latching engagement of said latch member first surface and said adapter gripping surface including a draw rod positioned in said spindle bore, said draw rod having a surface inclined with respect to the axis of said spindle bore and engageable with said latch member third surface, whereby forces applied to said adapter tending to pull the same axially outwardly of said bore are effectively resisted by having the engagement of said latch member second surface and the inclined surface in the spindle bore resolve said axial force into a component tending to move said latch member in a direction parallel to the inclined surface in said spindle bore, which movement is resisted by engagement of said latch member third surface with said draw rod surface.*

*34. The combination of claim 33 wherein spring means biases said draw bar to urge said latch bar first surface into engagement with the gripping surface of said adapter.*

*35. The combination claim 33 wherein said latch means includes a pair of generally identical latch members at diametrically opposite sides of said spindle bore.*

*36. The combination of claim 33 wherein said adapter gripping surface is positioned generally perpendicularly with respect to the axis of said spindle bore, and wherein said latch member first surface is also positioned generally perpendicularly with respect to the axis of said spindle bore.*

*37. The combination of claim 33 including collet means within said spindle bore for gripping said adapter body, and means for actuating said collet prior to the actuation of said latch means.*

*38. In combination, a machine tool having a rotatable spindle with an internal bore, a tool adapter positionable in said bore and having a body adapted to hold a tool at one end thereof, a collet in said spindle for gripping the adapter upon application of a longitudinal force to said collet, means for guiding said collet longitudinally in said spindle as said force is applied including means defining a longitudinally extending slot and a guide member received thereon, and latch means for engaging said adapter surface to prevent axial pull out of said adapter.*

*39. The combination of claim 38 wherein said slot is provided in said collet, and said guide member is fixed relative to said spindle and has a portion received in said collet slot.*

*40. In combination, a machine tool having a rotatable spindle with an internal bore, a tool adapter positionable in said bore and having a body adapted to hold a tool at one end thereof, said adapter having a surface disposed generally perpendicularly with respect to the rotational axis of said spindle, selectively operable constrictive means in said spindle to grip the adapter, and latch means having at least one surface disposed generally perpendicularly with respect to the rotational axis of said spindle for engaging said adapter surface to prevent axial pull out of said adapter.*

*41. In combination, a machine tool having a rotatable spindle with an internal bore, a tool adapter positionable in said bore and having a body adapted to hold a tool at one end thereof, selectively operable constrictive means in said spindle to grip the adapter, latch means for engaging said adapter to prevent axial pull out of said adapter, and a single power element for releasing both said constrictive means and said latch means, said element releasing said latch means prior to the release of said constrictive means.*

*42. In a machine tool utilizing a tool adapter having a body with locking means thereon, a spindle having a bore with a contractible collet engageable with said adapter body, latch means within said bore engageable with the locking means of the adapter, and means for actuating said collect and latch means, said actuating means having a portion in said spindle which is rotatable relative to said collet and latch means and is selectively engageable for actuation of the collet and latch means.*

*43. In a machine tool as defined in claim 41 in which said actuating means includes spring means for moving both said latch means and collet to active position and a single power element which acts in opposition to said spring means to release both said collet and said latch means, said power element being the portion of said actuating means which is rotatable relative to said collet and latch means.*

*44. In combination, a machine tool having a rotatable spindle with an internal bore, a tool adapter positionable in said bore and having a body adapted to hold a tool at one end thereof, selectively operable constrictive means in said spindle to grip the adapter, latch means mounted for radial and generally longitudinal movement for engaging said adapter surface, and means for moving said latch means into engagement with said adapter surface to prevent axial pull-out of said adapter.*

References Cited

The following references, cited by the Examiner, are of record in the patented file of this patent or the original patent.

UNITED STATES PATENTS

| | | | |
|---|---|---|---|
| 3,150,878 | 9/1964 | Budden et al. | 90—11 |
| 2,860,547 | 11/1958 | Stephan | 90—11 |

GERALD A. DOST, *Primary Examiner.*

U.S. Cl. X.R.

77—3